US006171380B1

(12) United States Patent
Wood et al.

(10) Patent No.: US 6,171,380 B1
(45) Date of Patent: Jan. 9, 2001

(54) MICROPROCESSOR COOLER WITH INTEGRAL ACOUSTIC ATTENUATOR

(75) Inventors: Richard J. Wood, North Syracuse; Philip L. Lavrich, Manlius; Patrick C. Marks, Minoa; Michael F. Taras, Fayetteville; Walter E. Lare, Jr., Chittenango, all of NY (US)

(73) Assignee: Carrier Corporation, Syracuse, NY (US)

( * ) Notice: Under 35 U.S.C. 154(b), the term of this patent shall be extended for 0 days.

(21) Appl. No.: 09/266,875

(22) Filed: Mar. 12, 1999

(51) Int. Cl.[7] ..................... B01D 46/30

(52) U.S. Cl. ..................... 96/386; 55/385.3; 55/443; 55/444; 55/445; 96/383; 96/384

(58) Field of Search ..................... 55/385.3, 442, 55/443, 444, 445; 96/380, 381, 383, 384, 385, 386, 388, FOR 172

(56) References Cited

U.S. PATENT DOCUMENTS 3,276,202 * 10/1966 Gary ..................... 96/386
3,559,760 * 2/1971 Ninomiya ..................... 96/386
4,425,145 * 1/1984 Reese ..................... 585/385.3
4,628,689 * 12/1986 Jourdan ..................... 55/444
5,000,768 * 3/1991 Hwang ..................... 55/385.3
5,912,368 * 6/1999 Satarino et al. ..................... 55/385.3

* cited by examiner

*Primary Examiner*—Duane Smith
*Assistant Examiner*—Minh-Chau T. Pham

(57) ABSTRACT

The air drawn into a diesel engine serially passes through a filter and a cavity, which acts as an acoustic attenuator, before being supplied to the cylinders of the diesel engine. In the cavity the air is in a heat transfer relationship with a heat sink for the electronic components of a microprocessor control. The electronic components may be located in the plenum cavity or in a separate chamber but must have a heat transfer relationship with the cavity, such as through a common wall on which the electronic components are mounted. A heat sink may extend into the cavity.

9 Claims, 3 Drawing Sheets

MICROPROCESSOR COOLER WITH INTEGRAL ACOUSTIC ATTENUATOR

BACKGROUND OF THE INVENTION

The miniaturization of electronic components has permitted the reduction of the volume requirements for control structures. While the miniaturization is normally accompanied with a reduced heat load, cooling of the electronic components is still normally required. The compactness permitted by miniaturization can complicate the cooling process. Additionally, the control structures can be located in conjunction with other structures which are located so as to minimize space requirements.

Transport refrigeration equipment, for example, must be located between the cab of the truck and the trailer while permitting the necessary relative movement between the truck and trailer. The refrigeration equipment must be external to the trailer so as to avoid reducing the cargo volume available and must present a streamlined profile to minimize wind resistance. Superimposed upon this is the need to provide more cooling capacity within the available space as trailer lengths and therefore the cooling requirements increase. It is desirable to locate the electronic controls in proximity to the devices being controlled such as valves, clutches, and motors in order to reduce the length, and cost, of the connecting electric harness. In placing such electronic controls near the devices being controlled, they are often placed in a harsh, high temperature environment, such as the engine compartment of a refrigeration unit, as well as near heat sources such as engines and compressors which may cause temperatures to exceed the allowable limits for the electronic controls.

SUMMARY OF THE INVENTION

A transport refrigeration unit is, typically, driven by a diesel engine. As is conventional for internal combustion engines, ambient air is drawn through a filter into the cylinders of the engine. The present invention uses the filtered air to provide the necessary cooling to the electronic components of the control structure. The electronic components may be mounted on heat sink structure which is in heat transfer contact with the filtered air being drawn into the diesel engine. The electronic components can also be located in a box, or the like, sealed from the ambient environment. An enhanced heat transfer surface can be located inside and/or outside the control box. An enhanced heat transfer surface will normally be located in the region of attachment of the control box/electronic components to the partition separating the box from the plenum/cavity or may form the partition. The plenum/cavity, in addition to providing a flow path conducive to heat transfer between the electronic components and the air being supplied to the engine, may also function as an attenuator for sound reduction.

It is an object of this invention to provide cooling to electronic components.

It is another object of this invention to use ambient air being drawn into an engine to cool electronic components.

It is a further object of this invention to incorporate a heat sink into an acoustic attenuator. These objects, and others as will become apparent hereinafter, are accomplished by the present invention.

Basically, the air drawn into a diesel engine serially passes through a filter and a cavity, such as a plenum, which acts as an acoustic attenuator, before being supplied to the cylinders of the diesel engine. In the cavity the air is in a heat transfer relationship with a heat sink for the electronic components of a microprocessor control. The electronic components may be located in the plenum cavity or in a separate chamber but must have a heat transfer relationship with the cavity, such as through a common wall on which the electronic components are mounted. A heat sink may extend into the cavity.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
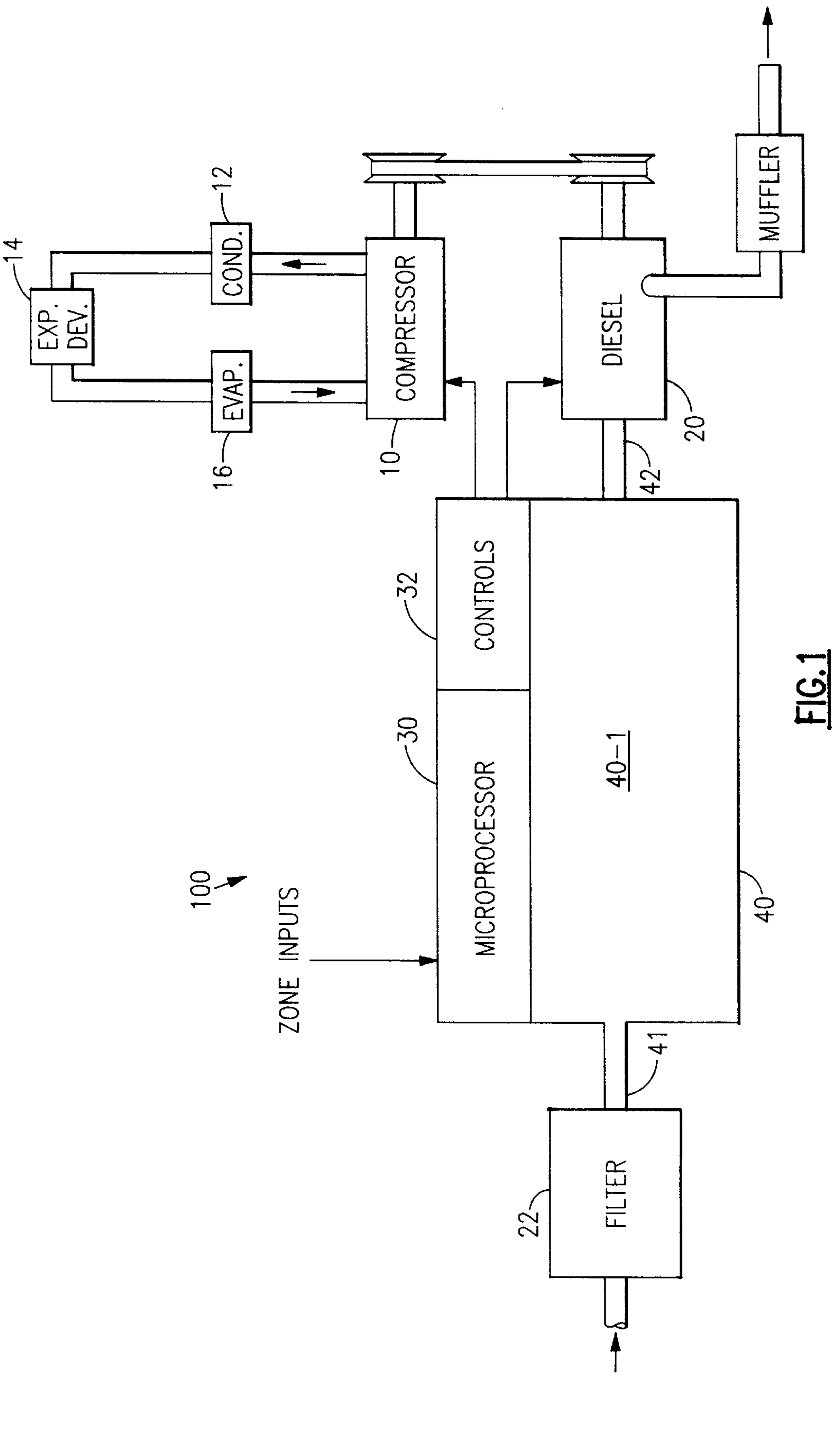
FIG. 1 schematic representation of the present invention as used with a diesel engine driven refrigeration system.

In FIG. 1, the numeral 100 generally designates a transport refrigeration system. Refrigeration compressor 10 is driven by diesel engine 20. Compressor 10 is in a refrigeration circuit serially including condenser 12, expansion device 14 and evaporator 16. Refrigeration system 100 is controlled by microprocessor 30 through refrigeration controls 32. Microprocessor 30 receives a number of inputs such as the sensed ambient temperature, condenser entering air temperature, zone temperature, and zone set point which are collectively labeled as zone inputs. In operation, diesel engine 20 is driven responsive to microprocessor 30 and draws ambient air into its cylinders and, as is conventional, draws the air through a filter 22. Due to the space constraints, microprocessor 30 is located close enough to the compressor 10, diesel 20 and/or other heat producing devices to be affected thereby. This is also true of electronic components associated with and controlled by microprocessor 30 such as relays, solenoids, etc. which make up the refrigeration controls 32. Since filtered ambient air is drawn into a diesel as part of its normal operation, the present invention recognizes that the filtered air being drawn into the diesel can be used for cooling.

Initially, it should be noted that heating the air delivered to the diesel is undesirable in that heating reduces the density of the air and therefore the mass per unit volume of air being drawn in is reduced. The air is drawn in at a location as remote from the heat sources as is practical in order to provide as cool of air as possible. Such inlet location, normally, is less subject to be polluted, as by diesel exhaust, or the like. The intake air path is routed such that it is in a heat exchange relationship with the microprocessor 30 and/or electronic components of refrigeration controls 32 requiring cooling. In routing the air path, a housing 40 defining a cavity or plenum chamber 40-1 may be formed which acts as an acoustic attenuator as well as providing a location for heat exchange with the microprocessor 30.

Figure 2:
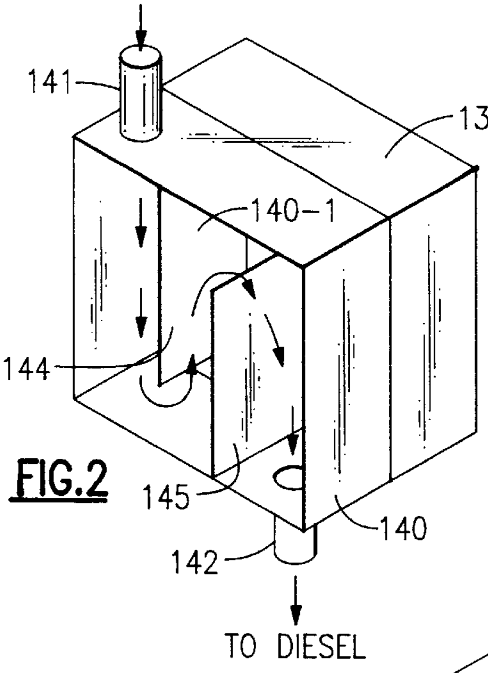
FIG. 2 shows a first modified cavity.
Figure 3:
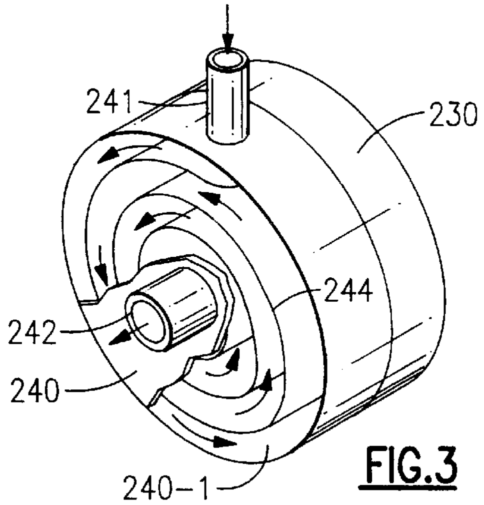
FIG. 3 illustrates a cavity defining a spiral path.

In the system of FIG. 1, the cavity or plenum chamber 40-1 provides a generally straight flow path between inlet pipe 41 and discharge pipe 42. The cavity or plenum chamber 40-1 acts as an acoustic attenuator and, in passing through cavity or plenum chamber 40-1 and over a partition or other structure in a heat exchange relationship with microprocessor 30, the air functions as a heat transfer media by removing heat generated by microprocessor 30. If controls 32 require cooling, they may be located adjacent microprocessor 30, as illustrated, so as to be cooled in the same manner as microprocessor 30 by air flowing through cavity 40-1. In FIG. 2, the housing 140 defines a more circuitous path than housing 40. Air entering cavity or plenum chamber 140-1 via inlet pipe 141 undergoes a series of turns due to the presence of partitions 144 and 145 which extend partially across chamber 140-1 from opposite sides of housing 140. Because of the presence of partitions 144 and 145 the cross section of the fluid path between inlet pipe 141 and outlet pipe 142 has a modest increase so that the speed of the air flow is still efficient for heat transfer. Additionally, since the flow path through chamber 140-1 is longer, the opportunity for heat transfer is enhanced as the air passes over the wall or other structure in a heat exchange relationship with microprocessor 130. Since the flow is more circuitous, there is also a reduction in noise as the air passes through cavity 140-1. Referring now to FIG. 3, the housing 240 is generally cylindrical. Helical partition 244 is located in housing 240 such that a helical path defines the cavity or plenum 240-1. Air entering cavity or plenum 240-1 via inlet pipe 241 passes through the spiral path defined by partition 244 before reaching outlet pipe 242. As in housing 140, the air flowing through housing 240 has a longer flow path than housing 40 thereby providing the opportunity for enhanced heat transfer as the air passes over the wall or other structure in heat exchange with microprocessor 230. The path also enhances noise attenuation.

Figure 4:
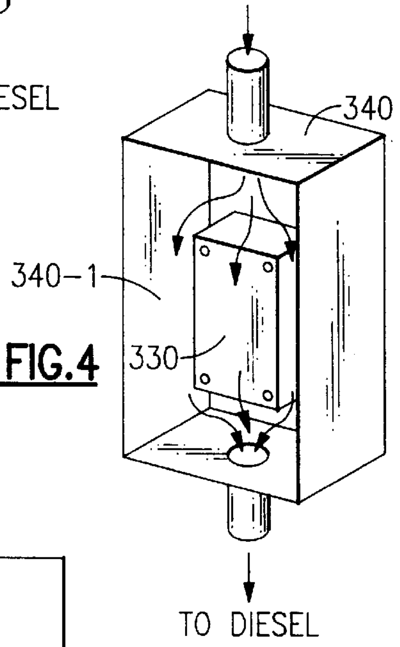
FIG. 4 shows the electronic controls in the cavity.

Referring now to FIG. 4, plenum housing 340 is similar to housing 40. The major differences are that microprocessor 330 is smaller than the side of the housing 340 on which it is mounted and is located therein and extends into plenum cavity 340-1 such that air flow can impinge directly on microprocessor 330 and/or its heat transfer structure on five of its six sides.

Figure 5:
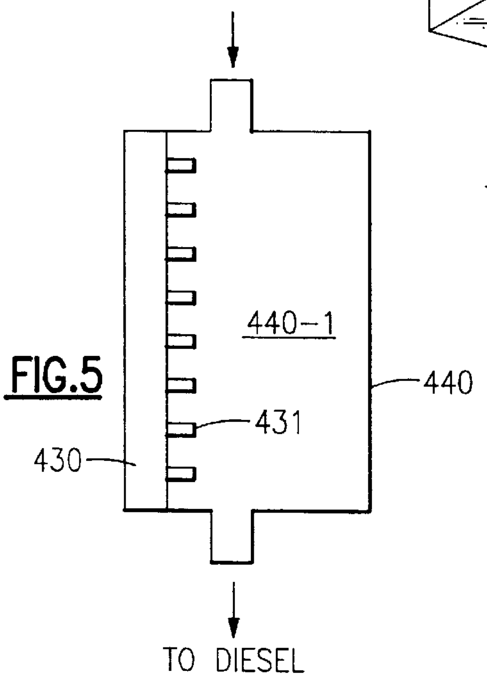
FIG. 5 shows an enhanced heat transfer surface extending into the cavity.

Referring to FIG. 5, housing 440 has one of the interior sides of the plenum or cavity 440-1 defined by microprocessor 430 and an enhanced heat transfer structure 431, such as a heat sink. The air flow through plenum or cavity 440-1 flows in a heat transfer relationship with the enhanced heat transfer structure 431 and, possibly, with any portion of microprocessor 430 that may be exposed to plenum or cavity 440-1.

Figure 6:
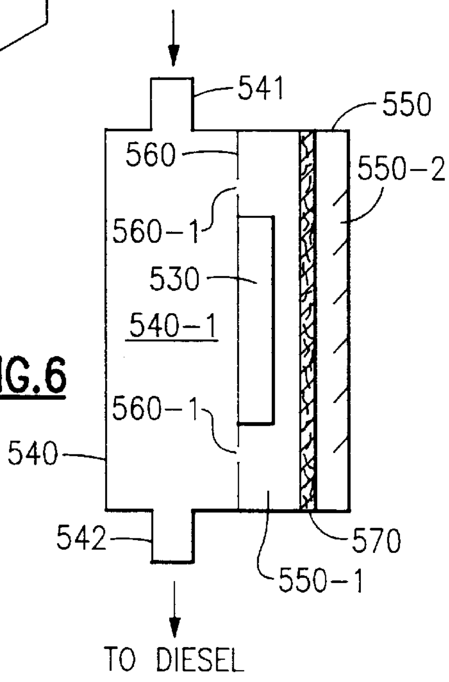
FIG. 6 shows a modified arrangement in which flow serially passes through a filter, over the electronic controls and into the cavity.

Referring now to FIG. 6, housing 540 defines plenum cavity 540-1. As in the case of plenum cavity 40-1, in FIG. 1, cavity 540-1 is connected to a diesel engine via discharge pipe 542 and to atmosphere via a filter, such as 22 of FIG. 1, and inlet pipe 541. Microprocessor 530 is in cavity 550-1 of control box 550 and is mounted on partition 560 which separates cavities 540-1 and 550-1. Apertures 560-1 are formed in partition 560 and provide fluid communication between cavity 550-1 and cavity 540-1. Louvers 550-2 are formed in control box 550 and are separated from cavity 550-1 by filter 570. The diesel engine creates a reduced pressure in plenum cavity 540-1 as air is drawn into the engine. In this embodiment there are, optionally, two flow paths for atmospheric air to reach plenum or cavity 540-1. First, as in the embodiments of FIGS. 1–4, atmospheric air is drawn through a filter, such as filter 22 of FIG. 1 before being drawn into plenum cavity 540-1. Flow through cavity 540-1 is in a heat transfer relationship with partition 560 and provides cooling for microprocessor 530. Second, atmospheric air is serially drawn through louvers 550-2, filter 570, cavity 550-1 and apertures 560-1 into plenum or cavity 540-1. In passing through cavity or 550-1, the air flows over microprocessor 530 is a heat transfer relationship. The flow from cavity 550-1 into cavity 540-1 can be due to both the difference in pressure between the cavities as well as by aspiration where the flow through cavity 540-1 is rapid enough. Alternatively inlet pipe 541 and filter 22 can be eliminated with all of the air passing through louvers 550-2, filter 570, and apertures 560-1 before being drawn into cavity 550-1.

Figure 7:
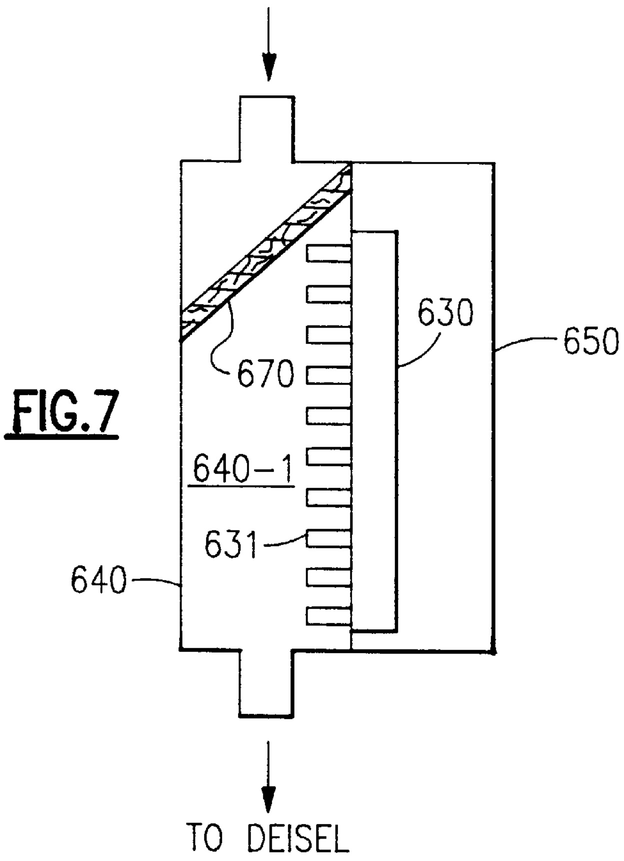
FIG. 7 illustrates the filter integrated into the plenum.

Referring to FIG. 7, filter 670 is located within housing 640 rather than being located upstream thereof. Microprocessor 630 is located in control box 650 but does not extend into plenum or cavity 640-1 but microprocessor 630 is in a heat transfer relationship with heat sink structure 631 which extends into plenum or cavity 640-1.

Air drawn into plenum or cavity 640-1 via filter 670 flows over heat sink 631 in a heat transfer relationship, thereby serving to cool microprocessor 630 before being drawn into diesel 20.

Figure 8:
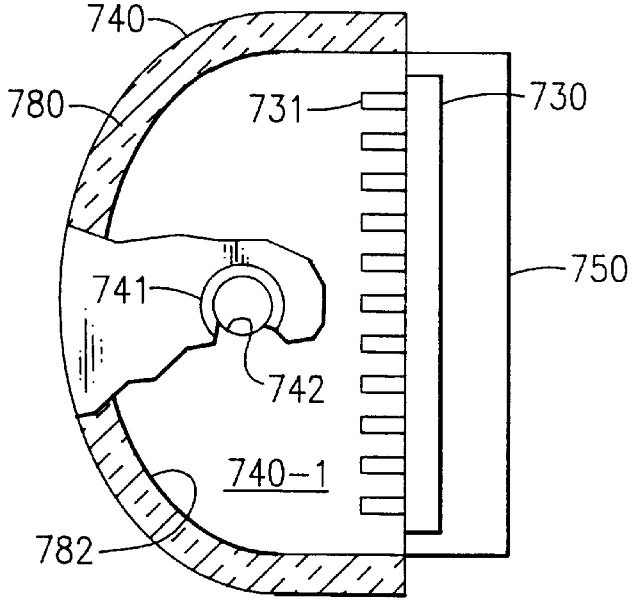
FIG. 8 illustrates a cavity having thermal insulation and acoustical absorption.

Referring to FIG. 8, housing 740 is lined with acoustical absorption material/thermal insulation 780, which may be fiberglass. Insulation 780 is lined with a retaining screen 782 which holds insulation 780 in place. Microprocessor 730 is located in control box 750 and is in a heat transfer relationship with heat sink 731 which extends into plenum cavity 740-1. Air drawn into plenum or cavity 740-1 via inlet pipe 741 flows over heat sink 731 in a heat transfer relationship, thereby serving to cool microprocessor 730 before being drawn via outlet pipe 742 into diesel 20.

Although preferred embodiments of the present invention have been described and illustrated, other changes will occur to those skilled in the art. For example, while the invention has been described in terms of a diesel powered refrigeration system, it is applicable to other internal combustion devices and for other systems requiring cooling combined with sound reduction. Also, the flow path through the plenum or cavity can be made more or less circuitous depending upon heat transfer and noise attenuation requirements and the placement of the microprocessor and controls may be such as to enhance the air flow over them. It is therefore intended that the scope of the present invention is to be limited only by the scope of the appended claims.

What is claimed is:

1. Means for providing cooling and attenuating sound comprising:

a housing defining a first cavity which acts as an acoustic attenuator;

said housing having an inlet for supplying air to said cavity and an outlet for drawing air from said cavity;

means for filtering air flowing into said first cavity;

heat producing apparatus which requires cooling;

said heat producing apparatus being in a heat transfer relationship with air flowing through said first cavity whereby flow in said first cavity cools said heat producing apparatus and is sound attenuated.

2. The means for providing cooling and attenuating sound of claim 1 wherein said housing defines a circuitous path through said first cavity.

3. The means for providing cooling and attenuating sound of claim 1 wherein said heat producing apparatus is in said first cavity.

4. The means for providing cooling and attenuating sound of claim 1 wherein said means for filtering air is located in said housing.

5. The means for providing cooling and attenuating sound of claim 1 further including:

a control housing defining a second cavity;

said heat producing apparatus being located in said second cavity;

means for permitting air to be drawn into said second cavity;

means for permitting flow from said second cavity to said first cavity;

means for filtering air located intermediate said means for permitting air to be drawn into said second cavity and said heat producing apparatus whereby filtered air passes in heat exchange relationship with said heat producing apparatus before being drawn into said first cavity.

6. The means for providing cooling and attenuating sound of claim 1 wherein said first cavity is lined with sound absorbing material.

7. The means for providing cooling and attenuating sound of claim 1 wherein said outlet is connected to a internal combustion engine which draws air through said first cavity.

8. The means for providing cooling and attenuating sound of claim 7 wherein said internal combustion engine is connected to and drives a refrigeration system.

9. The means for providing cooling and attenuating sound of claim 1 further including:

a control housing defining a second cavity;

said heat producing apparatus being located in said second cavity;

said inlet permitting air to be drawn into said second cavity;

means for permitting flow from said second cavity to said first cavity;

means for filtering air located intermediate and inlet and said heat producing apparatus and permitting air to be drawn into said second cavity containing said heat producing apparatus whereby filtered air passes in heat exchange relationship with said heat producing apparatus before being drawn into said first cavity.

* * * * *